No. 778,491. PATENTED DEC. 27, 1904.
W. A. HULL.
COUPLING.
APPLICATION FILED MAR. 26, 1904.
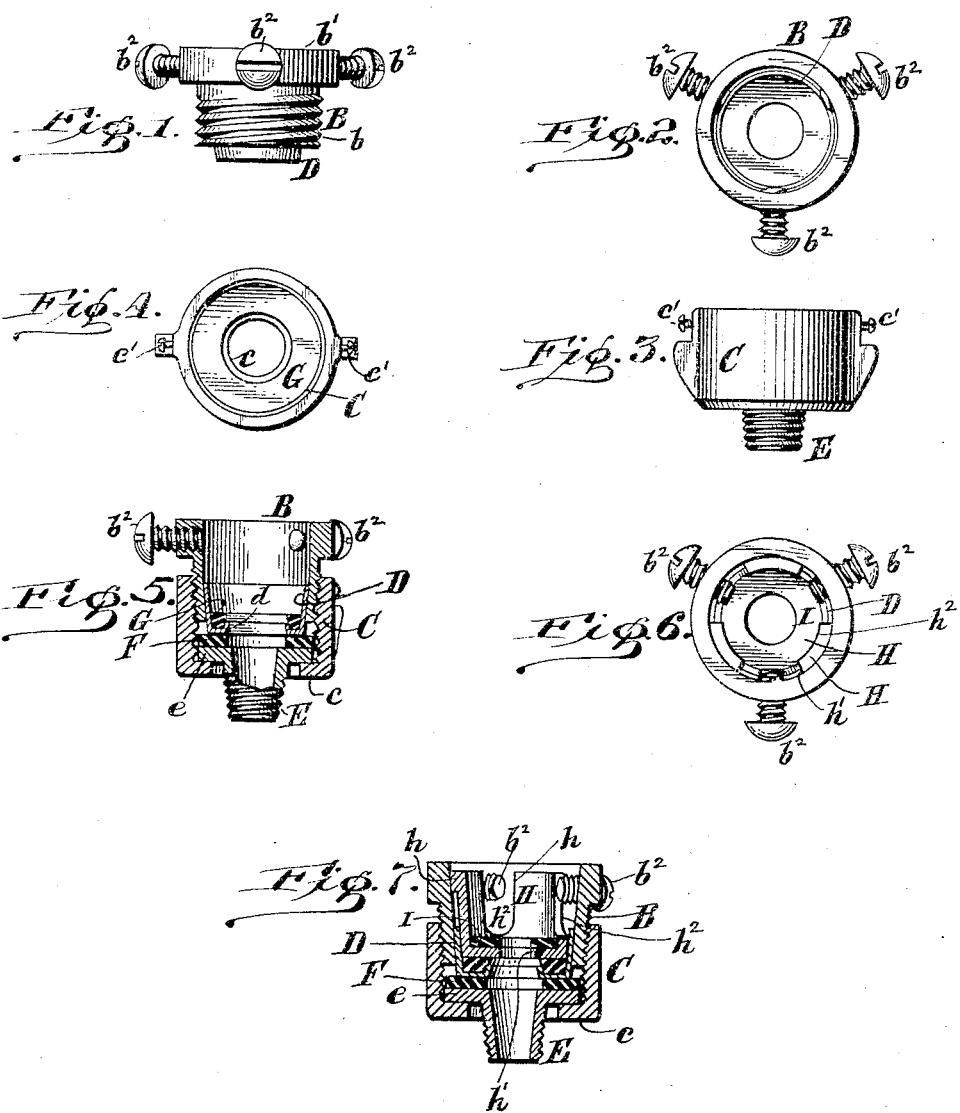

No. 778,491. Patented December 27, 1904.

UNITED STATES PATENT OFFICE.

WOLCOTT A. HULL, OF NEW YORK, N. Y.

COUPLING.

SPECIFICATION forming part of Letters Patent No. 778,491, dated December 27, 1904.

Application filed March 26, 1904. Serial No. 200,205.

*To all whom it may concern:*

Be it known that I, WOLCOTT A. HULL, a citizen of the United States, residing at No. 2135 Seventh avenue, in the borough of Manhattan, county of New York, and State of New York, have invented certain new and useful Improvements in Couplings, of which the following is a specification.

The object of my improvement is to provide a coupling which may connect two devices so as to make a tight joint between them.

My improvement consists in the combination, with two tubular coupling parts adapted to be joined by means of a screw-thread or equivalent means and provided with other means for attaching them to the devices to be united, of a piece intermediate of the two coupling parts made of annular shape and provided with a seat for packing material.

In the accompanying drawings, Figure 1 is a side view of one of the parts of my coupling. Fig. 2 is a plan or top view of the same with another part fitted into it. Fig. 3 is a side view of the other part of the coupling. Fig. 4 is a plan or top view of this part of the coupling. Fig. 5 is a central longitudinal section of the two parts of the coupling and an intermediate part united. Fig. 6 is a top view of the part of the coupling illustrated particularly by Figs. 1 and 2 with a reducing device inserted in it. Fig. 7 is a view similar to Fig. 5 of the reducing device added to the other part.

Similar letters of reference designate corresponding parts in all the figures.

As illustrated, my improvement is embodied in parts, one of which is adapted to be secured to the exterior of the nozzle of a faucet or bib.

The coupling consists, essentially, of two parts B C and an intermediate part D. The part B of the coupling is represented in Figs. 1, 2, and 5 as consisting of a body portion $b$ and a flange portion $b'$ at the upper extremity. The body portion $b$ is externally screw-threaded, and the flange portion $b'$ is provided with radially-arranged clamping-screws $b^2$, which project into the interior. Internally this coupling part is cylindric in its upper portion and downwardly tapering in its lower portion. The other coupling part, C, comprises an internally-screw-threaded ring adapted to engage with the external screw-thread of the body portion of the coupling part B and also comprises at its lower extremity an inwardly-turned flange $c$. If desirable, set-screws $c'$ may pass through tapped holes in the ring portion of the coupling part C and impinge against the coupling part B to prevent separation of the two coupling parts B C. This coupling part C is shown as having fitted to it a tubular piece E, which is made of a size to pass through the flange $c$ and is provided at its upper extremity with a flange $e$, which rests upon the upper surface of the flange $c$. Above the flange $e$ of the part E a ring F of any suitable packing material may advantageously be arranged.

Intermediate of the coupling parts B C the part D is arranged, and, as shown, it consists of an externally-tapering ring having an inwardly-turned flange $d$ at its lower extremity to support a ring G of suitable packing material. Preferably this part D may be made of elastic or yielding material—such, for example, as spun sheet-brass. The external tapering portion of the part D corresponds to the internal taper of the coupling part B. The lower extremity of the part D extends through the lower extremity of the coupling part B.

As shown in the figures under consideration, the coupling part B is secured directly to the exterior end of a nozzle of the faucet or bib by means of the clamping-screws $b^2$ with its open extremity or discharge end in contact with the ring G of packing material. The part C of the coupling is engaged with the part B in such a manner as to clamp the packing-ring F against the flange of the part D. Thus a tight joint will be made between the discharge end of the faucet or bib and the part E. This part E may of course be of any character or may connect with any device. For example, it may lead to a filter.

In Figs. 6 and 7 I have shown a reducing device H inserted in the coupling. It consists of a vertically-slotted body $h$ and an inwardly-turned flange $h'$ at the lower end, this flange forming a seat for a ring I of any suitable packing material. This reducing device H may advantageously be made of pewter, because then it can be molded. In the present instance it is shown as having three vertical slots $h^2$, because the coupling part B has three clamping-screws $b^2$, and the latter should pass through the reducing device and engage the exterior of the faucet or bib nozzle. It will be seen in Fig. 7 that the reducing device H fits inside the part D. It therefore will bear against the packing G and its packing-ring I will fit against the discharge end of the faucet or bib.

The part D is advantageous because it is capable of moving into different positions to adapt itself to the end of a faucet or analogous part when the coupling parts B C are secured thereto and engage with each other. It is preferable to make the part D of yielding material, because when so made it may better fulfil its purpose. The ring G of packing material also compensates for some irregularities in the faucet or analogous part, besides effecting a tight joint between the faucet or analogous part and the lower coupling part C.

Of course the reducing device will only be used where the coupling parts are to be attached to a faucet, bib, or other article having an external small discharge end.

What I claim is—

1. The combination with two tubular coupling parts adapted to be detachably connected, and one being provided with means for engaging it with the exterior of a tubular part such as a faucet, of a piece intermediate of said two coupling parts made of annular shape and arranged within one of the two coupling parts to extend into the other.

2. The combination with two tubular coupling parts adapted to be detachably connected and one being provided with means for engaging it with the exterior of a tubular part such as a faucet, of a piece intermediate of said two coupling parts made of annular shape and of flexible material and arranged within one of the two coupling parts to extend into the other.

3. The combination with two tubular coupling parts adapted to be detachably connected, of a piece intermediate of said two parts made of annular shape and arranged within one of the two coupling parts to extend into the other, and a reducer arranged in the same coupling part which contains the said annular parts, and constructed to extend into the latter.

4. The combination with two tubular coupling parts adapted to be detachably connected, and one being provided with means for connecting it to an externally-smooth tubular part, of a piece intermediate of said two coupling parts made of annular shape and arranged within one of the two coupling parts to extend into the other.

In testimony whereof I have signed this specification in the presence of two subscribing witnesses.

WOLCOTT A. HULL.

Witnesses:
   A. L. O'Brien,
   K. G. Le Ard.